US009098976B2

(12) United States Patent
Zimmermann

(10) Patent No.: US 9,098,976 B2
(45) Date of Patent: Aug. 4, 2015

(54) SCATTER SYMBOLS IN GAME AWARD DIFFERENT NUMBER OF FREE GAMES AND MULTIPLIERS

(75) Inventor: Stefan Zimmermann, Graz (AT)

(73) Assignee: GTECH Germany GmbH, Lubbecke (DE)

( * ) Notice: Subject to any disclaimer, the term of this patent is extended or adjusted under 35 U.S.C. 154(b) by 2390 days.

(21) Appl. No.: 11/609,281

(22) Filed: Dec. 11, 2006

(65) Prior Publication Data

US 2008/0139285 A1 Jun. 12, 2008

(51) Int. Cl.

| | |
|---|---|
| ***A63F 9/24*** | (2006.01) |
| ***A63F 13/00*** | (2014.01) |
| ***G07F 17/32*** | (2006.01) |

(52) U.S. Cl.
CPC ........ *G07F 17/3267* (2013.01); *G07F 17/3244* (2013.01)

(58) Field of Classification Search
CPC ........................................................ G01F 17/32
USPC ...................................................... 463/17, 20
See application file for complete search history.

(56) References Cited

U.S. PATENT DOCUMENTS

| | | | | |
|---|---|---|---|---|
| 7,758,414 | B1 * | 7/2010 | Marks et al. | 463/20 |
| 2002/0010017 | A1 * | 1/2002 | Bennett | 463/20 |
| 2002/0045474 | A1 * | 4/2002 | Singer et al. | 463/20 |
| 2003/0069056 | A1 * | 4/2003 | Cormack et al. | 463/16 |
| 2004/0048646 | A1 * | 3/2004 | Visocnik | 463/16 |
| 2004/0087359 | A1 * | 5/2004 | Cuddy et al. | 463/20 |
| 2004/0235556 | A1 * | 11/2004 | Flemming et al. | 463/20 |
| 2005/0026677 | A1 * | 2/2005 | Roukis | 463/20 |
| 2006/0199634 | A1 * | 9/2006 | Anderson et al. | 463/20 |

* cited by examiner

*Primary Examiner* — Kang Hu
*Assistant Examiner* — Marcus Jones
(74) *Attorney, Agent, or Firm* — Patent Law Group LLP; Brian D. Ogonowsky

(57) ABSTRACT

Disclosed herein is a game played on a gaming device that displays a randomly selected array of symbols, where the symbols across one or more paylines are evaluated by circuitry to determine an award to be granted. A trigger event, such as the occurrence of a certain plurality of special symbols, initiates a series of free games. The number of free games and an award multiplier associated with each free game are dependent on the particular type of special symbols making up the trigger event.

20 Claims, 6 Drawing Sheets

Results of first spin after wager

Prior to first spin after wager

Results of first spin after wager

Results of first spin after wager

Results of first free game

SCATTER SYMBOLS IN GAME AWARD DIFFERENT NUMBER OF FREE GAMES AND MULTIPLIERS

FIELD OF THE INVENTION

This invention relates to gaming devices, such as slot machines, and, in particular, to additional features performed in a game that grants awards to a player based upon displayed symbols.

BACKGROUND

Common slot machines randomly select and display an array of symbols on a video screen, then grant an award to a player based on the occurrence of certain symbol combinations across paylines. Typically, the game ends after the symbols are displayed and the award, if any, is granted. Although these types of games are highly successful, it is advantageous to provide an additional feature to this basic game to make the game more interesting to a player. A more interesting game will generate increased revenue to the casino by its increased play.

SUMMARY

Disclosed herein is a game played on a gaming device that displays a randomly selected array of symbols, such as a video slot machine, and electro-mechanical slot machine, or a video monitor connected to a computer for on-line gaming. In one embodiment, the array is 5×3 symbol positions. The combinations of symbols across one or more activated paylines are evaluated by a processor to determine an award to be granted. The present invention adds an additional feature to this conventional operation of a gaming machine.

In one embodiment of the present invention, a variety of special symbols are disposed around actual or virtual reels. A certain combination of the special symbols, such as three or more of the special symbols being displayed, causes each of the special symbols to award an associated number of free games, with any awards during the free games multiplied by an associated multiplier. For example, the special symbols may be $1, $2, $3, $4, and $5. Upon a combination of, for example, the special symbols $1, $2, and $4 being displayed on the screen after the reels have been rotated and randomly stopped, the player wins 5 free games with a ×1 multiplier for the $1 symbol, 5 free games with a ×2 multiplier for the $2 symbol, and 3 free games with a ×5 multiplier for the $4 symbol. The free games associated with each multiplier are then played in sequence until all 13 free games are played.

In one embodiment, during the free games, additional free games may be awarded upon the occurrence of a trigger event. The trigger event may be one or more special symbols occurring during the free games, rather than the three or more special symbols needed for the trigger event during the base game, to increase the chances that the player will win more free games during play of a free game.

The number of free games and the multiplier may be any number for a particular special symbol. Although in the above example, the special symbols were scatter symbols (i.e., payline does not matter), the trigger event that initiates the special feature may require the special symbols to occur across a single payline.

Other variations are described.

DETAILED DESCRIPTION

The invention can typically be implemented by installing a software program in a modern video or electro-mechanical gaming machine.

Figure 1:
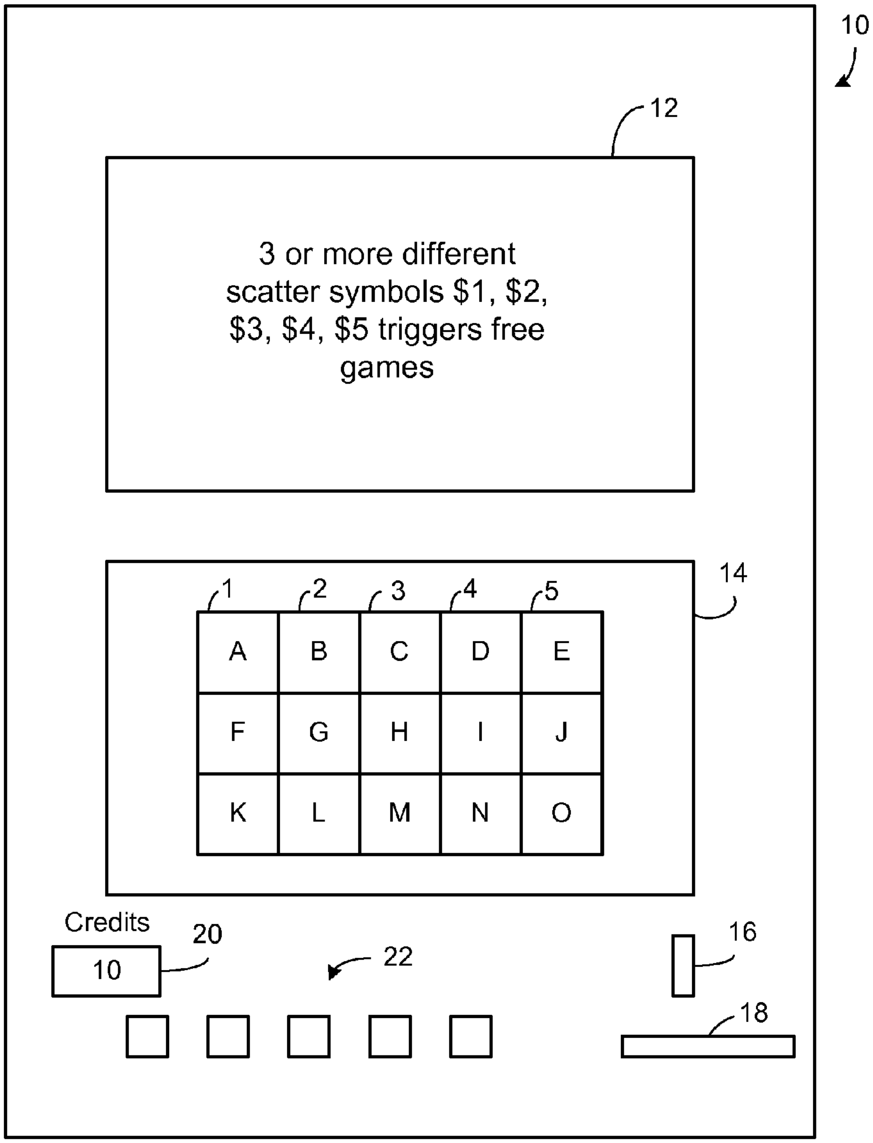
FIG. 1 illustrates a gaming machine prior to a first spin, where the machine has two screens, where one screen displays a 5×3 array of symbols and the other screen provides information about the special feature, in accordance with one embodiment of the present invention.

FIG. 1 is a simplified front view of a video slot machine 10. Many other types of platforms may be used instead to implement the invention. The slot machine 10 has an upper video screen 12 and a lower video screen 14. Each screen may be a thin film transistor (TFT) display, a liquid crystal display (LCD), a cathode ray tube (CRT), or any other type of display. In another embodiment, a single screen displays all the information needed to play the game.

A coin slot 16 receives coins or tokens, and a bill slot 18 receives bills or coupons. A separate slot may dispense payment coupons for cashless gaming, and/or a coin tray (not shown) may receive coins upon the player cashing out via a coin hopper.

Prior to cashing out, awards are typically granted to the player by incrementing a credit counter 20. Control buttons 22 allow the player to spin the simulated reels, make bets, cash out, or enter other conventional instructions.

One example of the game will be described with respect to the figures.

In FIG. 1, the player has inserted a bet or has credits remaining. The credit meter 20 shows that the player has 10 credits to play the game. The lower screen 14 depicts five simulated reels 1-5 forming five columns and three rows of symbols to create a 5×3 array of symbols. The 5×3 array shows the symbols A-O from a previous game, where the player did not obtain a trigger event for initiating the inventive feature. In the example, it is assumed that the trigger event is the occurrence of three or more special symbols anywhere in the display. The special symbols are $1, $2, $3, $4, and $5. Randomly selecting the symbol array on the lower screen 14 is referred to as the base game.

In one embodiment, each virtual reel has only one type of special symbol (e.g., reel 1 only contains the $1 symbol, etc.). In another embodiment, a reel may have more than one type of special symbol.

Although symbols A-O are used for simplicity, standard symbols include fruit symbols and symbols associated with the theme of the particular slot machine. The special symbols may be different color diamond symbols or other types of symbols. The particular icons used are not important. For amusement, each vertical column of symbols is scrolled to emulate a motor-driven reel, and each of the virtual reels is typically stopped in sequence after a few seconds to reveal the final 5×3 array of symbols.

The upper screen 12 may have any purpose and is optional. In the example, the upper screen is used to explain the features to the player and helps the player keep track of free games she has won. The upper screen 12 may also show all the available winning symbol combinations and the awards as a static display and then show the features once the trigger event occurs. A display glass may also show the winning symbol combinations and awards.

After the player makes the bet (assume 10 credits) and optionally selects paylines using the control buttons 22, the five reels spin and randomly stop. Although a pseudorandom algorithm is typically used in gaming machines, the term "random" is used herein to mean either pseudorandom or random.

Figure 2:
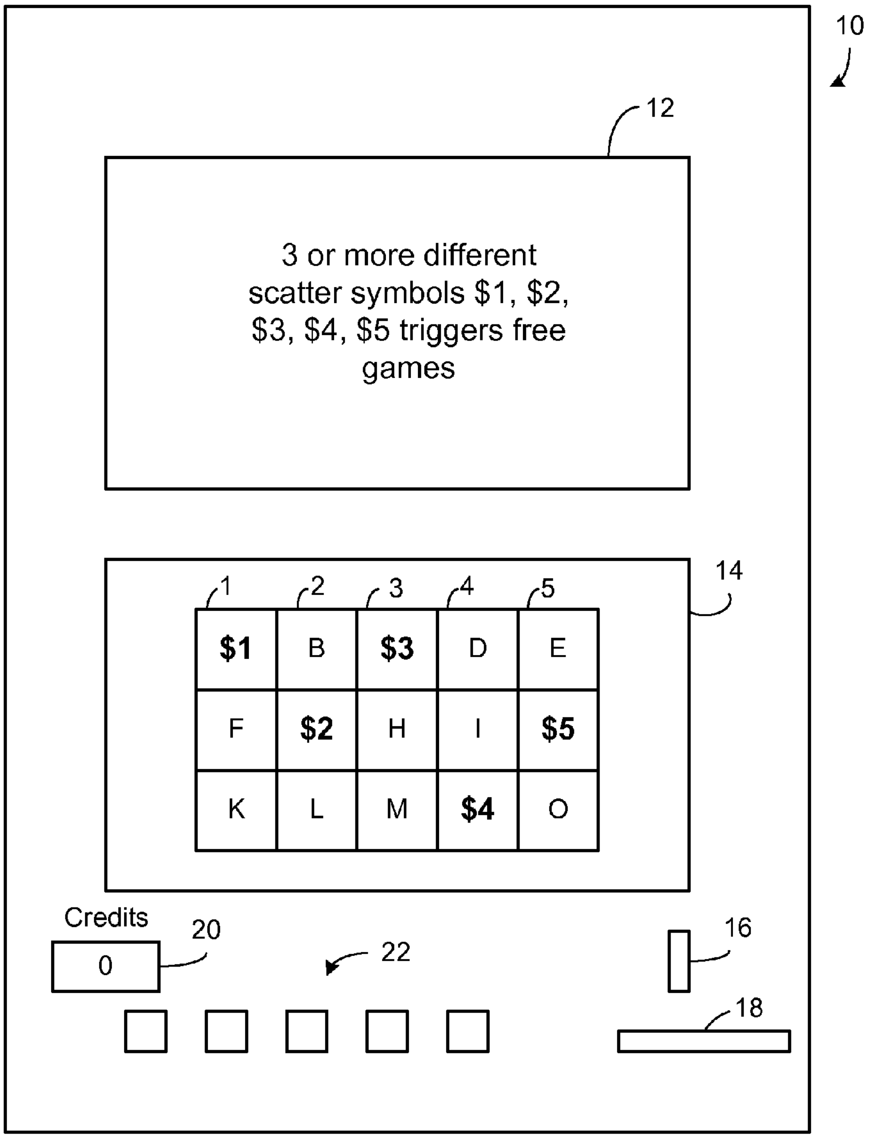
FIG. 2 illustrates the machine of FIG. 1 after the first spin, where the machine displays a trigger event (three or more special symbols ($X) in the base game.

FIG. 2 illustrates the new 5×3 array of symbols that results from the stopped reels. The player is granted an award for any winning symbol combinations in the base game prior to any feature game occurring. A trigger event occurred in FIG. 2 since more than three special symbols are displayed. The special symbols are scatter symbols, which means they do not have to be on the same payline to be effective. The special symbols appearing on the screen are sensed by a microprocessor in the slot machine, and the microprocessor initiates the free games.

Figure 3:
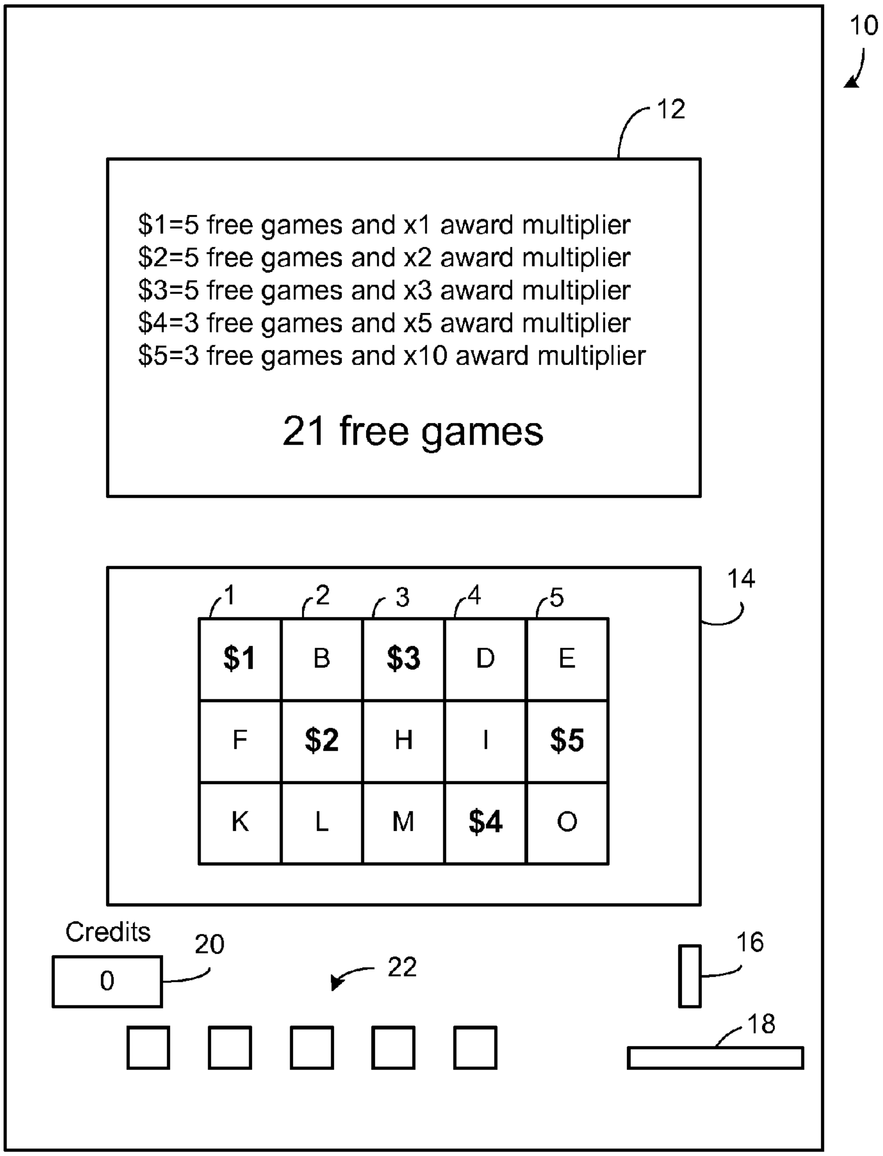
FIG. 3 illustrates the machine of FIG. 2, where the top screen displays the number of free games the player has just won and the associated award multipliers during the free games.

FIG. 3 illustrates how the upper screen 12 is used to display the free game rules and what free games the player has won. Any form of presentation of the awarding of the free games, such as animation, may be suitable. In the present example, assuming the trigger event has occurred, the display of a $1 symbol awards the player 5 free games and any award is multiplied by 1; the display of a $2 symbol awards the player 5 free games and any award is multiplied by 2; the display of a $3 symbol awards the player 5 free games and any award is multiplied by 3; the display of a $4 symbol awards the player 3 free games and any award is multiplied by 5; and the display of a $5 symbol awards the player 3 free games and any award is multiplied by 10. Any number of free games and multipliers may be associated with the special symbols. Typically, the multiplier is based on the likelihood that the particular special symbol will occur in a display, where the lowest likelihood special symbol has the highest multiplier. The winning symbol combinations during the free games may be the same as or different from the winning symbol combinations during the base game.

Since the player obtained the special symbols $1, $2, $3, $4, and $5 in the example of FIG. 2, the player gets 21 free games with various award multipliers. Each of the special symbols involved in the trigger event grants the player the free games and multiplier associated with that special symbol. For example, had only three $1 symbols been the trigger event, the player would receive 15 free games with a ×1 multiplier.

The player then plays the free games by pressing the spin-reels button (one of control buttons 22) or pulling a handle. The bet and active paylines applied to the free games will typically be the same as those used for the base game. This encourages the player to play the maximum bet in the base game.

The free games are played in sequence, starting with the free games with the lowest multiplier so the player's excitement level builds to the higher multiplier games.

In another embodiment, the free games are played in another sequence, such as in the order that the special symbols appeared in the reel display.

Figure 4:
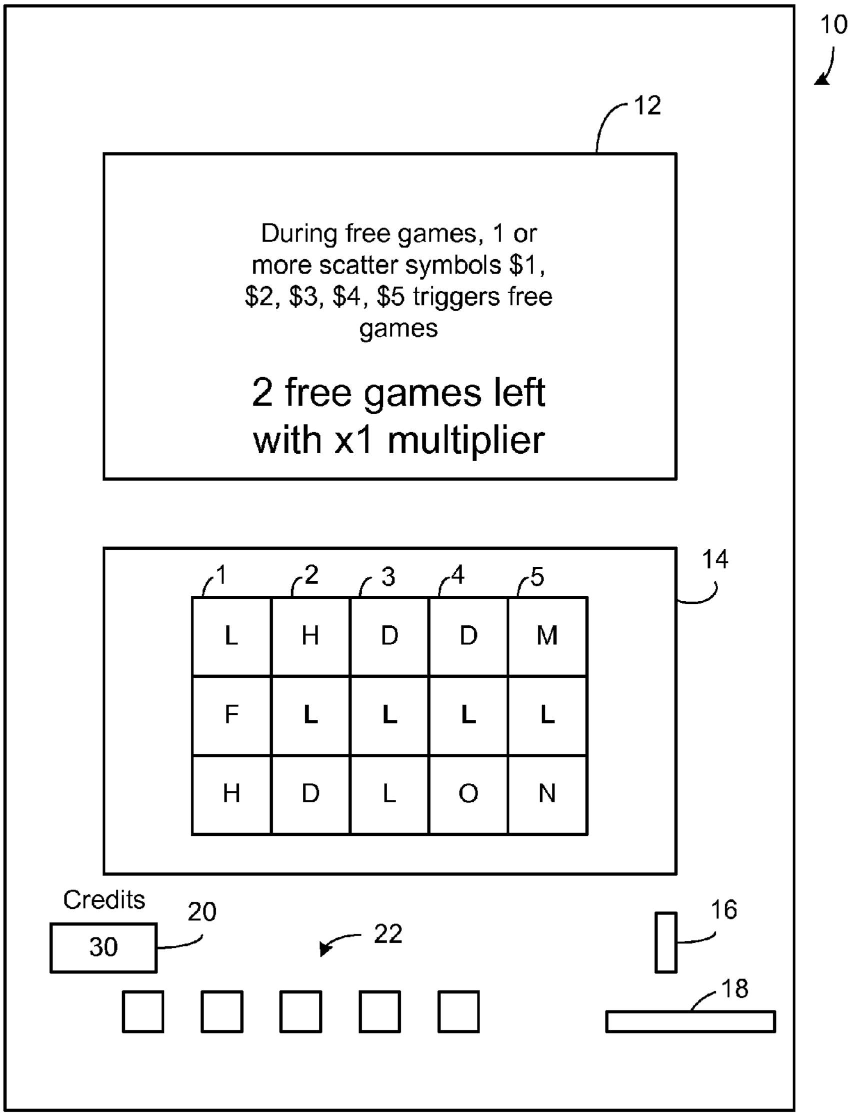
FIG. 4 illustrates the machine of FIG. 3 after the first free game is played, where the top screen displays the status of the free games.

FIG. 4 shows the display after the first free game is played. Assuming the player wins 30 credits for the four L's across the center payline, this win increments the credit counter 20 by 30. This win is not multiplied since the free spin is a result of the $1 symbol being part of the trigger event, which provides no multiplier. During free games having a multiplier greater than 1, any award is multiplied by that multiplier.

Illustrating subsequent free game examples is not necessary to fully understand the invention.

Figure 5:
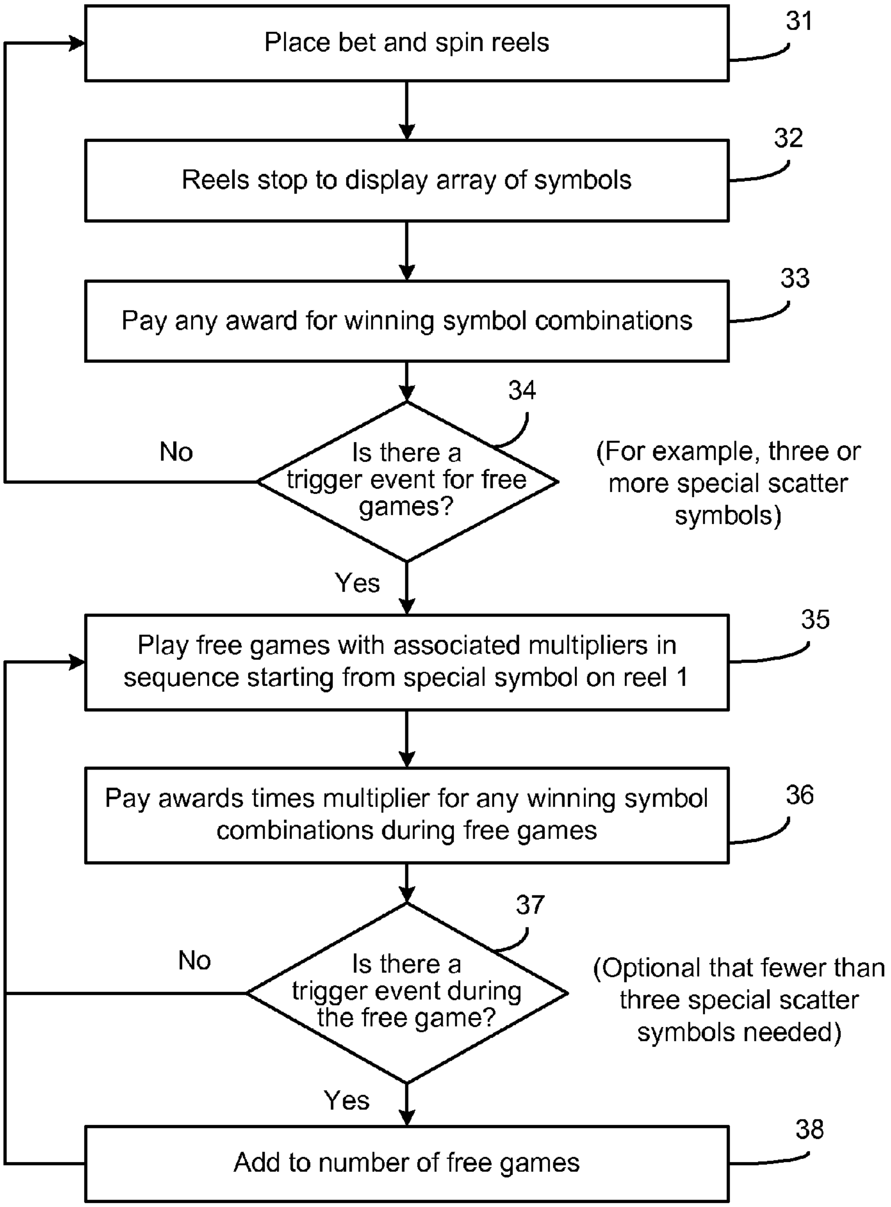
FIG. 5 is a flowchart of a method in accordance with one embodiment of the invention.

FIG. 5 is a flowchart of the basic steps in one embodiment of the invention. In step 31, the player makes a bet and spins the reels.

In step 32, an array of symbols is displayed in the base game.

In step 33, any awards are paid for winning symbol combinations across activated paylines.

In step 34, it is determined by the machine's microprocessor whether a trigger event has occurred. If not, the game is over.

If a trigger event has occurred, in step 35, the microprocessor determines the sequence of free games to be played and the award multipliers.

In step 36, any award generated for winning symbol combinations in a free game is multiplied by the associated multiplier. In another embodiment, some of the symbols in the free game automatically generate an award without the symbol being part of a winning combination, and such an award is multiplied by the award multiplier.

In step 37, the microprocessor determines whether a trigger event occurred during the free game. If a number of special symbols occurred during the free games, such special symbols award additional free games along with award multipliers. These additional free games may be played at the end of the other free games or in any other sequence. In one embodiment, only one special symbol is needed to be displayed during the free games in order to win additional free games. Thus, the likelihood of obtaining a trigger event is increased during the free games.

If no trigger event occurred in step 37, the free game sequence is continued. If a trigger event occurred in step 37, additional free games are won in step 38.

Figure 6:
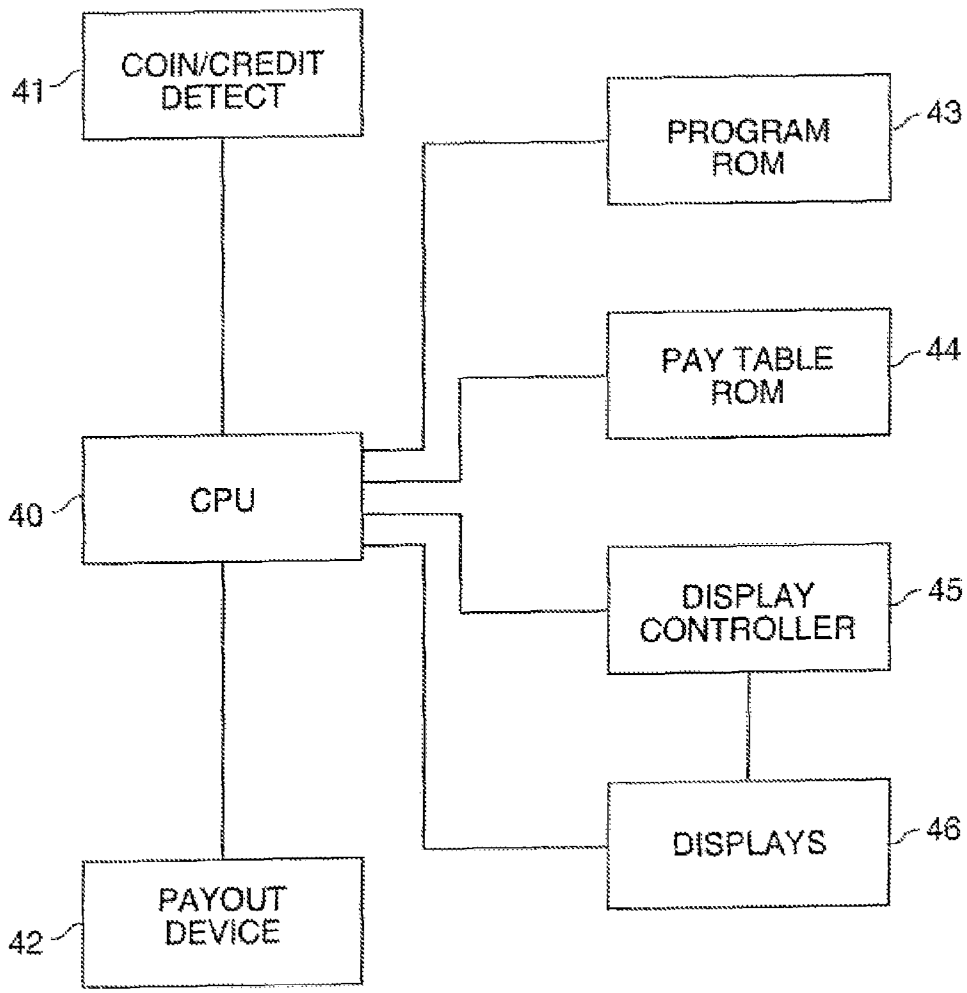
FIG. 6 is a block diagram of the main components in the gaming machine of FIG. 1.

FIG. 6 illustrates basic circuit blocks in a suitable gaming device. A control unit (CPU 40) runs a gaming program (including the invention) stored in a program ROM 43. The program ROM 43 may include a pseudorandom number generator program for selecting symbols and for making other random selections. A coin/credit detector 41 is sensed by the CPU 40 to determine if there are sufficient credits to play the game. A pay table ROM 44 detects the outcome of the game and identifies awards to be paid to the player. A payout device 42 pays out an award to the player in the form of coins upon termination of the game or upon the player cashing out. The payout may also be in the form of a coded paper ticket, credits on a smart card or magnetic strip card, or in any other form. A display controller 45 receives commands from the CPU 42 and generates signals for the various displays 46. If a display 46 is a touch screen, player commands may be input through the display screen into the CPU 40.

Instead of the gaming machine being a video gaming machine, the machine may use stepper-motor driven reels to select and display the symbol array. Such reel-type machines are processor controlled, and the reels simply display an array of symbols that have already been predetermined by the processor. The machine may display the free game information on a video screen and used motor driven reels to display the symbols. The machine may also be a player's home computer where the player plays via the Internet.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a slot machine comprising:

receiving, by the slot machine, a monetary wager made by a player via a wager input device as part of the slot machine;

receiving, by the slot machine, a game initiation signal by the player controlling a game initiation device, as part of the slot machine, to initiate a game;

in response to receiving the game initiation signal, controlling a display, as part of the slot machine, by a processor to visibly display, in a base game, a first array of symbols in an array of symbol positions that have been randomly selected, certain combinations of symbols along one or more displayed paylines providing an award for a player, available symbols for being randomly selected including a plurality of different types of special symbols, each type of special symbol being associated with a certain number of free games and an award multiplier, the award multiplier including multipliers greater than one, wherein each type of special symbol is associated with a unique combination of free games and award multiplier, so different types of the special symbols are not associated with a same combination of free games and award multiplier, and wherein there are a variety of different numbers of free games associated with the different types of special symbols and a variety of different award multipliers associated with the different types of special symbols;

detecting a trigger event in the base game by the processor, the trigger event comprising the display of a certain plurality of the special symbols in the first array;

as a result of the trigger event, awarding the player a number of free games, to be played on the slot machine, associated with each type of special symbol displayed in the first array;

after the base game, playing the free games awarded as a result of the trigger event, each free game being associated with a particular type of special symbol that identifies the number of free games;

multiplying any award won in a free game prior to a next free game being played, due to an occurrence of a winning display of symbols, by an award multiplier associated with the particular type of special symbol that is associated with the free game; and receiving a cash out signal by the player controlling a cash out device, as part of the slot machine, to cash out any accumulated awards.

2. The method of claim 1 wherein the special symbols are scatter symbols.

3. The method of claim 1 wherein the trigger event comprises at least three special symbols being displayed in the first array.

4. The method of claim 1 wherein the trigger event comprises at least three special symbols being displayed in the first array across a single payline.

5. The method of claim 1 wherein the first array is a 5×3 array of symbols.

6. The method of claim 1 wherein the first array of symbols is displayed on a video screen.

7. The method of claim 1 wherein each special symbol is associated with a multiplier that is different from multipliers associated with other ones of the special symbols.

8. The method of claim 1 wherein each special symbol appearing in the first array, if part of the trigger event, generates a number of free games associated with that special symbol, and any awards won by the player during those free games is multiplied by a multiplier associated with that special symbol.

9. The method of claim 1 wherein the free games are played in a sequence starting with free games having the lowest multiplier to free games having the highest multiplier.

10. The method of claim 1 wherein at least one multiplier is five or greater.

11. The method of claim 1 where the first array is created by actual or virtual rotating reels that randomly stop.

12. The method of claim 11 wherein each reel only has one type of special symbol.

13. The method of claim 1 wherein each free game is played using a same bet amount as used in a base game that generated the first array.

14. A slot machine comprising:

a wager input device for detecting a monetary wager made by a player;

a game initiation device for touching by the player to initiate a game;

a display; and at least one processor adapted for and programmed to perform the following:

receiving, by the slot machine, a monetary wager made by a player via a wager input device as part of the slot machine;

receiving, by the slot machine, a game initiation signal by the player controlling a game initiation device to initiate a game;

in response to receiving the game initiation signal, controlling the display, by the at least one processor, to visibly display, in a base game, to display a first array of symbols in an array of symbol positions that have been randomly selected, certain combinations of symbols along one or more paylines providing an award for a player, available symbols for being randomly selected including a plurality of different types of special symbols, each type of special symbol being associated with a certain number of free games and an award multiplier, the award multiplier including multipliers greater than one, wherein each type of special symbol is associated with a unique combination of free games and award multiplier, so different types of the special symbols are not associated with a same combination of free games and award multiplier, and wherein there are a variety of different numbers of free games associated with the different types of special symbols and a variety of different award multipliers associated with the different types of special symbols;

detecting a trigger event in the base game, the trigger event comprising the display of a certain plurality of the special symbols in the first array;

as a result of the trigger event, awarding the player a number of free games associated with each type of special symbol displayed in the first array;

after the base game, carrying out the free games awarded as a result of the trigger event, each free game being associated with a particular type of special symbol that identifies the number of free games;

multiplying any award won in a free game prior to a next free game being played, due to an occurrence of a winning display of symbols, by an award multiplier associated with the particular type of special symbol that is associated with the free game; and receiving a cash out signal by the player controlling a cash out device, as part of the slot machine, to cash out any accumulated awards.

15. The device of claim 14 wherein the special symbols are scatter symbols.

16. The device of claim 14 wherein the trigger event comprises at least three special symbols being displayed in the first array.

17. The device of claim 14 wherein the first array is a 5×3 array of symbols.

18. The device of claim 14 wherein each special symbol is associated with a multiplier that is different from multipliers associated with other ones of the special symbols.

19. The device of claim 14 wherein each special symbol appearing in the first array, if part of the trigger event, generates a number of free games associated with that special symbol, and any awards won by the player during those free games is multiplied by a multiplier associated with that special symbol.

20. The device of claim 14 where the first array is created by actual or virtual rotating reels in the display that randomly stop.

* * * * *